United States Patent
Dalcher

(10) Patent No.: US 8,739,189 B2
(45) Date of Patent: May 27, 2014

(54) SYSTEM, METHOD, AND COMPUTER PROGRAM PRODUCT FOR INVOKING AN APPLICATION PROGRAM INTERFACE WITHIN AN INTERCEPTION OF ANOTHER APPLICATION PROGRAM INTERFACE

(75) Inventor: Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 1437 days.

(21) Appl. No.: 12/019,514

(22) Filed: Jan. 24, 2008

(65) Prior Publication Data

US 2013/0276002 A1    Oct. 17, 2013

(51) Int. Cl.
*G06F 3/00*     (2006.01)
*G06F 9/54*     (2006.01)

(52) U.S. Cl.
CPC ..................................... *G06F 9/541* (2013.01)
USPC .......................................................... 719/328

(58) Field of Classification Search
CPC ...................................................... G06F 9/541
USPC ........ 719/332, 310, 328, 330; 707/206; 718/1
See application file for complete search history.

(56) References Cited

U.S. PATENT DOCUMENTS

| | | | |
|---|---|---|---|
| 5,889,994 A * | 3/1999 | Brown et al. ................. | 717/125 |
| 5,974,549 A | 10/1999 | Golan | |
| 5,987,610 A | 11/1999 | Franczek et al. | |
| 6,073,142 A | 6/2000 | Geiger et al. | |
| 6,460,050 B1 | 10/2002 | Pace et al. | |
| 6,658,571 B1 * | 12/2003 | O'Brien et al. ................. | 726/26 |
| 6,684,329 B1 | 1/2004 | Epstein et al. ................. | 713/150 |
| 7,225,428 B1 * | 5/2007 | Fetzer et al. ................... | 717/124 |
| 7,496,903 B2 * | 2/2009 | Rees et al. ..................... | 717/130 |
| 7,506,155 B1 | 3/2009 | Stewart et al. | |
| 7,516,178 B1 * | 4/2009 | DeFrang et al. ............... | 709/203 |
| 7,587,724 B2 * | 9/2009 | Yeap .............................. | 719/328 |
| 8,353,033 B1 | 1/2013 | Chen et al. | |
| 2002/0162024 A1 | 10/2002 | Cunchon et al. .............. | 713/201 |
| 2002/0178271 A1 | 11/2002 | Graham et al. ................ | 709/229 |
| 2004/0117658 A1 | 6/2004 | Klaes ............................. | 713/201 |
| 2004/0133777 A1 | 7/2004 | Kiriansky et al. ............. | 713/166 |
| 2005/0071633 A1 | 3/2005 | Rothstein | |
| 2005/0071811 A1 * | 3/2005 | Appavoo et al. .............. | 717/122 |
| 2005/0081019 A1 | 4/2005 | DeWitt, Jr. et al. ........... | 712/227 |
| 2005/0091558 A1 | 4/2005 | Chess et al. .................... | 714/38 |
| 2005/0108562 A1 | 5/2005 | Khazan et al. | |
| 2005/0125687 A1 | 6/2005 | Townsend et al. ............ | 713/200 |
| 2005/0149726 A1 | 7/2005 | Joshi et al. .................... | 713/164 |

(Continued)

FOREIGN PATENT DOCUMENTS

WO    2013/025323 A1    2/2013

OTHER PUBLICATIONS

Ulrich Bayer, TTAnalyze: A Tool for Analizing Malware, , 2006.*

(Continued)

*Primary Examiner* — Lechi Truong
(74) *Attorney, Agent, or Firm* — Wong, Cabello, Lutsch, Rutherford & Brucculeri, LLP

(57) ABSTRACT

A system, method, and computer program product are provided for invoking an application program interface within an interception of another application program interface. In use, a first application program interface invoked utilizing a first thread is intercepted. Further, a second application program interface is invoked within the interception of the first application program interface, utilizing a second thread.

15 Claims, 5 Drawing Sheets

(56) References Cited

U.S. PATENT DOCUMENTS

| | | |
|---|---|---|
| 2005/0188210 A1 | 8/2005 | Perlin et al. ............... 713/183 |
| 2005/0198061 A1* | 9/2005 | Robinson et al. ............ 707/102 |
| 2007/0074227 A1* | 3/2007 | Naidu et al. ................ 719/330 |
| 2007/0283192 A1* | 12/2007 | Shevchenko ................ 714/39 |
| 2009/0113111 A1 | 4/2009 | Chen et al. |
| 2009/0150990 A1* | 6/2009 | Vayman ..................... 726/17 |
| 2010/0011209 A1 | 1/2010 | Kiriansky et al. |
| 2010/0064367 A1 | 3/2010 | Hansen et al. |
| 2011/0083176 A1 | 4/2011 | Martynenko et al. |
| 2012/0255000 A1 | 10/2012 | Sallam et al. |

OTHER PUBLICATIONS

Fernandes, "Proxy instalation," WindowSecurity.com, Oct. 16, 2002, windowsecurity.com/whitepapers/Proxy_instalation_.html.

International Search Report and Written Opinion received for PCT application No. PCT/US2012/048415, mailed on Dec. 10, 2012, 9 Pages.

Dalcher, Gregory W., "System, Method and Computer Program Product for Analyzing Stack Call Frames That Are Monitored While a Stack Is Unwound" U.S. Appl. No. 11/749,635, filed May 16, 2007.

Dalcher, Gregory W., "System, Method and Computer Program Product for Monitoring and/or Analyzing at Least One Aspect of an Invocation of an Interface", U.S. Appl. No. 11/626,808, filed Jan. 24, 2007.

Dalcher, Gregory W., "System, Method, and Computer Program Product for Identifying Unwanted Data Based on an Assembled Execution Profile of Code", U.S. Appl. No. 12/042,923, filed Mar. 5, 2008.

Dalcher, "System, Method, and Computer Program Product for Dynamically Adjusting a Level of Security Applied to a System", U.S. Appl. No. 12/111,851, filed Apr. 29, 2008.

\* cited by examiner

SYSTEM, METHOD, AND COMPUTER PROGRAM PRODUCT FOR INVOKING AN APPLICATION PROGRAM INTERFACE WITHIN AN INTERCEPTION OF ANOTHER APPLICATION PROGRAM INTERFACE

FIELD OF THE INVENTION

The present invention relates to application program interfaces, and more particularly to monitoring application program interfaces.

BACKGROUND

Traditionally, application program interface (API) usage has been monitored for various purposes. For example, many times intrusion prevention systems monitor API usage to detect malicious activity. However, conventional techniques for monitoring API usage have generally exhibited various limitations, particularly where such techniques intercept API invocations for monitoring purposes. Just by way of example, during processing of an intercepted API invocation, a secondary API may be invoked from within the interception. Invocation of such secondary API from within the interception of the first API may be associated with unwanted results.

In some exemplary situations, a resource required for completion of the secondary API may be unavailable until the first API completes, thus resulting in deadlock and/or livelock of an associated process. In other exemplary situations, unnecessary serialization may occur due to the serialization of resources required by the secondary API, further resulting in a delay in the completion of the first API. In yet other exemplary situations, unintended effects of the usage of the secondary API from within the context of a thread invoking the first API may occur, such as manipulation of thread-specific data internally managed by the secondary API. Further, many APIs that may be invoked as a secondary API may not necessarily support a timeout, thereby perpetually intercepting the first API.

There is thus a need for overcoming these and/or other issues associated with the prior art.

SUMMARY

A system, method, and computer program product are provided for invoking an application program interface within an interception of another application program interface. In use, a first application program interface invoked utilizing a first thread is intercepted. Further, a second application program interface is invoked within the interception of the first application program interface, utilizing a second thread.

DETAILED DESCRIPTION

Figure 1:
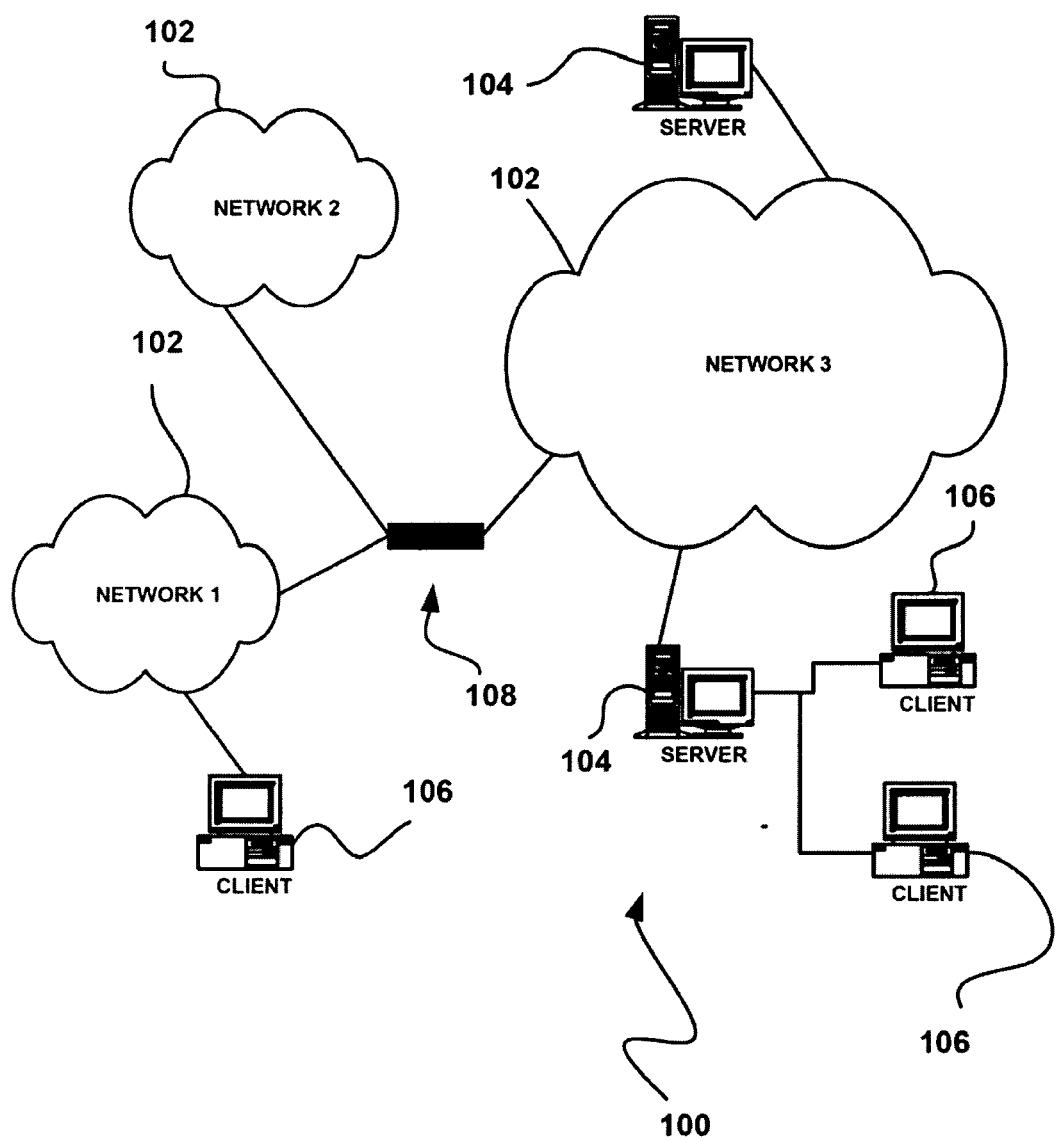
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
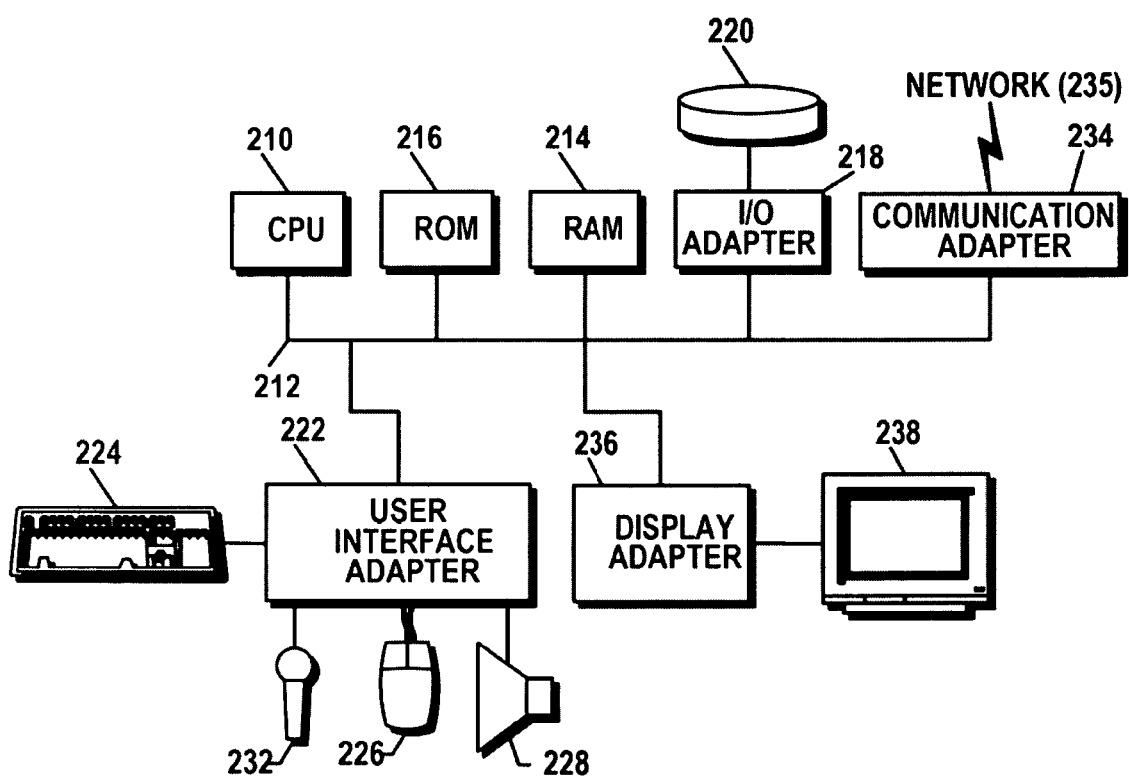
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
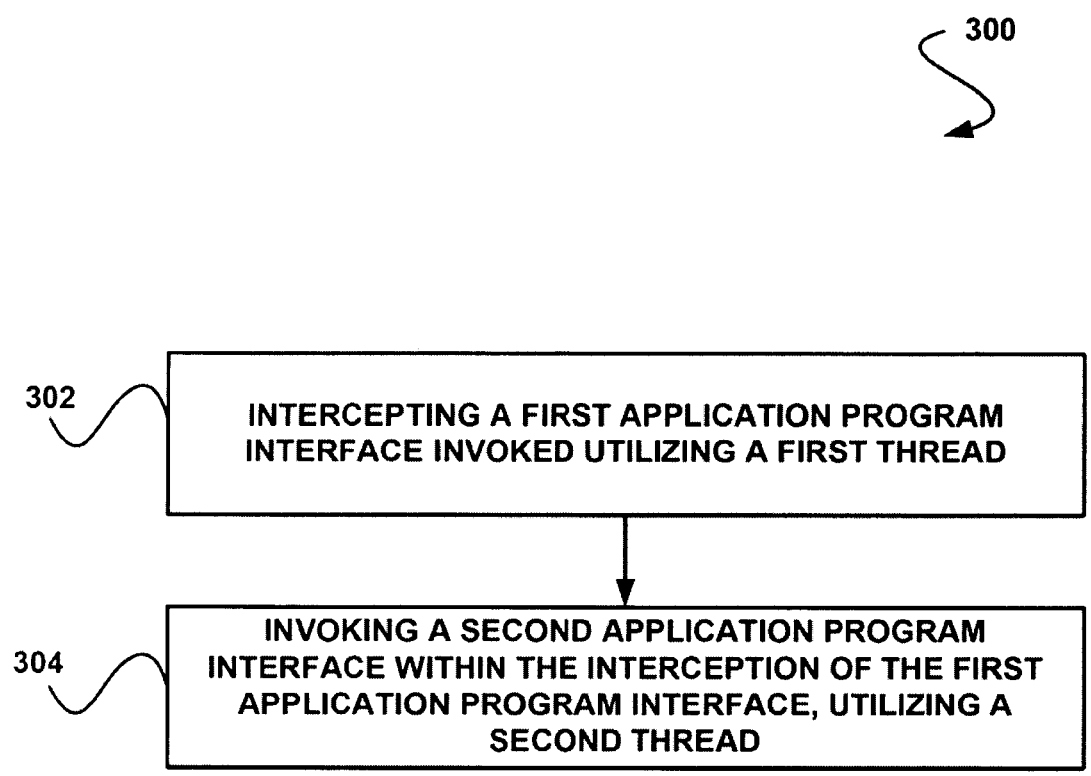
FIG. 3 shows a method for invoking a second application program interface within an interception of a first application program interface, in accordance with one embodiment.

FIG. 3 shows a method 300 for invoking a second application program interface within an interception of a first application program interface, in accordance with one embodiment. As an option, the method 300 may be carried out in the context of the architecture and environment of FIGS. 1 and/or 2. Of course, however, the method 300 may be carried Out in any desired environment.1

As shown in operation 302, a first application program interface (API) invoked utilizing a first thread is intercepted. In the context of the present description, the first API may include any interface capable of being utilized for interfacing an application. For example, the first API may be utilized for accessing services provided by a device (e.g. such as any of the devices described above with respect to FIGS. 1 and/or 2).

Additionally, the first API may be monitored. The first API may be monitored by a security system (e.g. intrusion prevention system, etc.), as an option. In one embodiment, the first API may be monitored for identifying requests to invoke the first API.

Further, the first thread may include any process, task, etc. utilized to invoke the first API. Still yet, the first API may be invoked in any manner that utilizes the first thread. Just by way of example, the first API may be invoked by initiating execution of the first API via the first thread, calling the first API, etc. As another example, the first API may be invoked by a process executing on a device secured via the security system.

Moreover, the first API invocation may be intercepted in any manner. As an option, the first API invocation may be intercepted in a kernel mode. As another option, the first API invocation may be intercepted in a user mode.

In one embodiment, the first application program interface may be intercepted utilizing the API interception handler. Such API interception handler may include a callback function that is called when the first API is invoked. For example, the API interception handler may be called when the first API is requested to be invoked, which may optionally be identified based on the monitoring, etc.

As an option, the API interception handler may include a pre-handler that is called when the first API is invoked but before the first API executes. As another option, the API interception handler may include a post-handler that is called after the API has been executed.

In another embodiment, the API interception handler may be utilized for performing any desired type of processing with respect to the first API. For example, such processing may include parameter checking, monitoring results of the first API invocation, modifying results of the first API invocation, blocking the invocation of the first API, etc. Moreover, the processing may be utilized for detecting unwanted activity (e.g. malware, etc.) associated with the invocation of the first API.

Also, as shown in operation 304, a second API is invoked within the interception of the first API, utilizing a second thread. In one embodiment, the second API may be different from the first API. For example, the second API may be utilized for interfacing an application different from the application interfaced by the first API. Of course, in another embodiment, the second API may include the first API, thus resulting in a recursive invocation of the first API.

In addition, invoking the second API within the interception of the first API may include invoking the second API within the context of the API interception handler. In one embodiment, the second API may include an API secondary to the first API. Thus, the second API may optionally be invoked based on the invocation of the first API.

Furthermore, the second thread may include any thread that is different from the first thread, in the context of the present description. In one embodiment, the second thread may include a worker thread. The worker thread may optionally include a thread utilized for invoking the second API on behalf of the first thread.

As another option, the worker thread may be selected from a plurality of worker threads for invoking the second API. The plurality of worker threads may be replenished with a new worker thread in response to termination or stalling of the selected worker thread, etc. Of course, however, the number of worker threads in the plurality of worker threads may be limited (e.g. based on a predefined configuration, etc.). As yet another option, the worker thread may be created for invoking the second API, etc.

To this end, results of the invocation of the second API may be returned to a caller (e.g. the API interception handler) via the second thread, such that the first thread may continue processing of the interception of the first API. Further, invoking the second API utilizing the second thread may prevent the second API from affecting the first thread.

In one embodiment, using a second thread separate from the first thread may allow a timeout capability to optionally be utilized. For example, a limited duration may be applied to the first thread by the API interception handler while waiting for the results of the second API invocation to complete in the second thread. Accordingly, the second API may be prevented from being invoked directly within the API interception handler and thus potentially entering into an unlimited duration wait for the second API invocation to complete.

Further, if the second API invocation does not complete, only the worker thread may be deadlocked, as an option. The first thread may timeout while waiting for the second thread, based on the limited duration applied to the second thread. In addition, the impact of unnecessary serialization within the invocation of the second API may be controlled utilizing the limited duration. Whether deadlock, livelock or stalling results from the unnecessary serialization, if the second thread does not complete by the limited duration, the second thread may abort further processing of the second API and may allow the first API to complete execution, avoiding deadlocking or stalling the caller of the second API.

Additionally, performing the invocation of the second API from within the second thread may prevent other unintended side-effects associated with the use of the second API affecting the first thread. Examples of such unintended side-effects may include implicit settings of a state specific to the thread calling the second API, such as that performed when component object model (COM) initialization functions are called. U.S. patent Ser. No. 11/314,398, filed Dec. 21, 2005 and entitled "System, Method And Computer Program Product For Hooking A COM Interface" describes examples such COM initialization functions, and is hereby incorporated by reference. Optionally, if the second thread stalls on the invocation of the second API, such second thread may be terminated without affecting the first thread. As another option, it may be ensured that the second thread is not holding a lock prior to terminating the second thread.

Still yet, utilizing the second thread for invoking the second API within the interception of the first API may prevent recursive lock acquisition failure. If a lock is unable to be acquired recursively and the first thread already owns the lock, the second API invocation that may attempt to acquire the lock may be prevented from hanging. For example, a recursive attempt to acquire the lock within the first thread may be avoided by utilizing the second thread, and may also allow the first thread to abort processing of the interception of the first API and complete the execution of the first API invocation. In this way, the second thread may be safely terminated if it has not acquired another lock.

In addition, utilizing the second thread for invoking the second API within the interception of the first API may prevent deadlock. The deadlock may be a result of an attempt to acquire an already held Windows® loader lock. The loader lock may be implicitly acquired when a dynamic link library (dll) is loaded. If the second API requires obtaining this lock a deadlock may occur. Thus, utilizing the second thread may prevent the deadlock since such second thread may attempt to acquire a different Windows® loader lock than that already held by the first thread.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
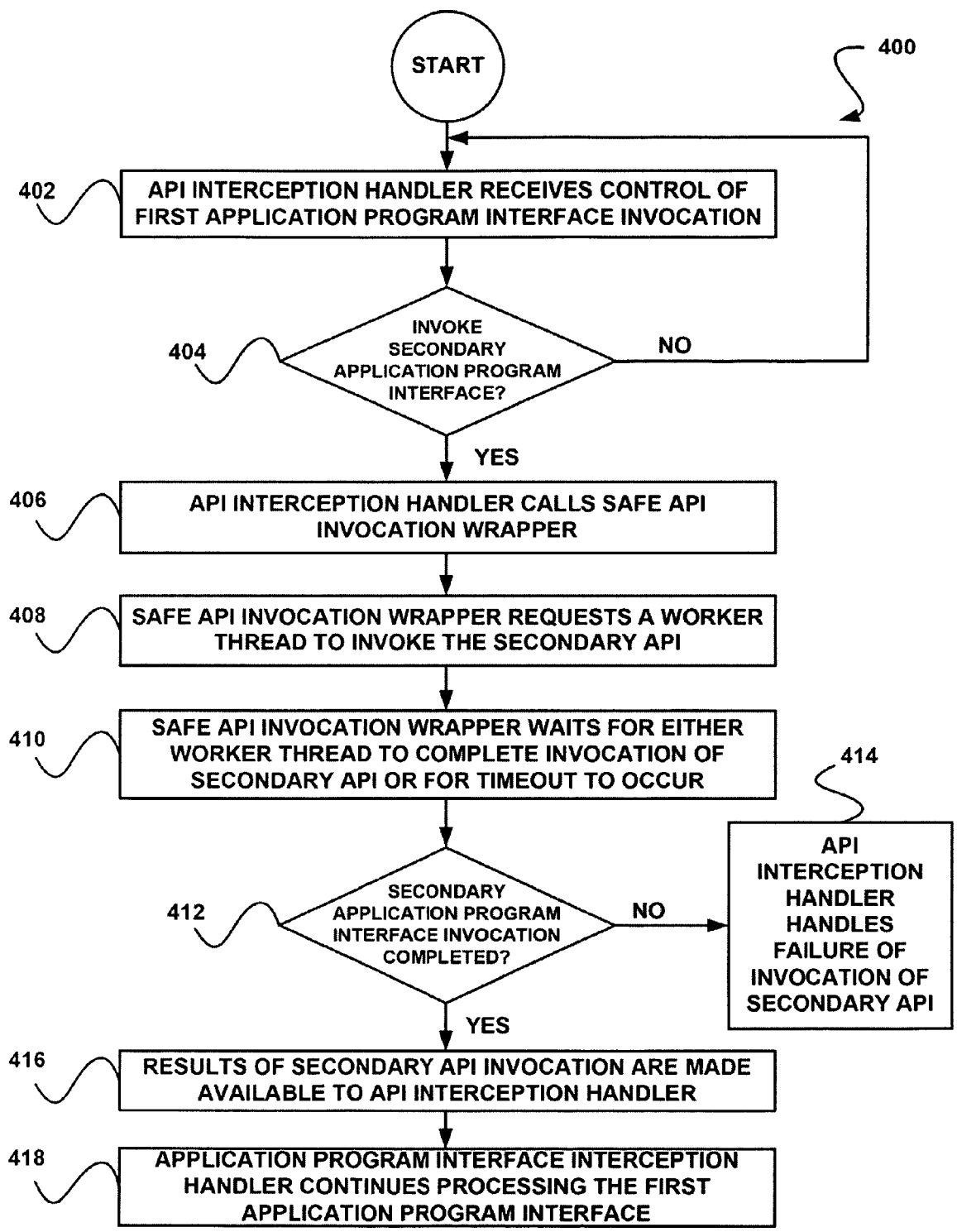
FIG. 4 shows a method for providing results of a secondary API invocation to an API interception handler controlling a first API invocation, in accordance with another embodiment.

FIG. 4 shows a method 400 for providing results of a secondary API invocation to an API interception handler controlling a first API invocation, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, an API interception handler receives control of a first API invocation. In one embodiment, the API interception handler may receive control of the first API invocation by intercepting the first API invocation. For example, the invocations of the first API may be monitored, such that the API interception handler may be called in response to invocation of the first API. In another embodiment, receiving control of the first API invocation may include executing the first API invocation utilizing a thread of the API interception handler.

Additionally, it is determined whether a secondary API is to be invoked, as shown in decision 404. In the context of the present embodiment, the secondary API may include any API to be invoked within the context of the controlled the first API. Thus, the secondary API may be secondary to the first API. In one embodiment, it may be determined that the secondary API is to be invoked if the first API calls the secondary API.

In another embodiment, the determination may include determining whether the secondary API is to be invoked directly within the API interception handler or utilizing a thread separate from the API interception handler (e.g. such as utilizing a worker thread, etc.). Just by way of example, it may be determined that the secondary API is to be invoked utilizing a thread separate from the API interception handler if the secondary API is identified as a type that at least potentially causes unwanted affects with respect to the first API (e.g. such as deadlocking, etc.). Of course, however, it may be determined whether the secondary API is to be invoked directly within the API interception handler or utilizing a thread separate from the API interception handler based on any desired criteria.

As another example, it may be determined that the secondary API is to be invoked directly within the API interception handler based on a caller of the secondary API. Such caller may include the API interception handler, for example. Optionally, the caller may indicate that the secondary API is to be invoked directly within the API interception handler utilizing a parameter (e.g. associated with the call to invoke the secondary API, etc.).

If, in decision 404, it is determined that the secondary API is not to be invoked (or optionally that the secondary API is not be invoked utilizing a thread separate from the API interception handler), the API interception handler receives control of another first API invocation (operation 402). In this way, for each first API that is invoked, it may be determined whether a secondary API is to be invoked.

If, however, it is determined in decision 404 that the secondary API is to be invoked, the API interception handler calls a safe API invocation wrapper. Note operation 406. In one embodiment, the API invocation wrapper may include a function. Thus, calling the safe API invocation wrapper may include invoking the safe API invocation wrapper.

Optionally, the safe API invocation wrapper may package a request utilized for invoking the secondary API, as an option. As another option, the safe API invocation wrapper may accommodate a syntax associated with the first API (and optionally other syntaxes capable of being associated with other APIs). In this way, the request utilized for invoking the secondary API may be packaged with limited or no code modifications.

Further, as shown in operation 408, the safe API invocation wrapper requests a worker thread to invoke the secondary API. With respect to the present embodiment, the worker thread may include any thread separate from the thread of the API interception handler utilized to control the first API invocation. For example, the worker thread may be executed on behalf of the thread of the API interception handler utilized to control the first API invocation.

To this end, the safe API invocation wrapper may communicate with the worker thread (e.g. for transmitting the request to the worker thread, etc.). For example, the safe API invocation wrapper may signal to a waiting worker thread (e.g. a worker thread included in a plurality of worker threads, such as a pool of worker threads) to invoke the secondary API. Optionally, the request to invoke the secondary API may include parameters for invoking the secondary API, such that the parameters may be passed to the worker thread.

In addition, the worker thread to which the request is sent may be selected in any desired manner. In one embodiment, the worker thread may be selected based whether the whether the safe API invocation wrapper was called by the API interception handler in a kernel mode or a user mode. Just by way of example, the safe API invocation wrapper may select a model (e.g. kernel or user) of worker thread that corresponds with the mode in which the safe API invocation wrapper was called. Of course, it should be noted that the safe API invocation wrapper may also directly invoke the secondary API from within the API interception handler, such that the first API and the secondary API may be invoked within the same thread (note decision 404).

Still yet, the safe API invocation wrapper waits for either the worker thread to complete invocation of the secondary API or for a timeout to occur. Note operation 410. In addition, the thread of the API interception handler controlling the first API invocation may also wait (e.g. prevent further processing of the first API invocation) for either the worker thread to complete invocation of the secondary API or for a timeout to occur. In one embodiment, the worker thread may complete invocation of the secondary API if the worker thread completes processing associated with the invocation of the secondary API. For example, the worker thread may send a signal to the safe API invocation wrapper indicating that the invocation of the secondary API has completed.

In another embodiment, the timeout may include a timeout condition provided by the safe API invocation wrapper. Thus, since the secondary API invocation is processed utilizing the worker thread that is separate from the thread utilized to invoke the first API, a timeout capability may be provided (e.g. even in situations where the first API does not provide a timeout condition, etc.). The timeout may indicate a time period threshold in which the safe API invocation wrapper terminates waiting for the worker thread to complete invocation of the secondary API.

As an option, the safe API invocation wrapper may support function overloading and default parameters. In this way, a global replace of an API name may be performed while preventing specification of additional parameters, such as the timeout value. For example, a default timeout value may be utilized. Such function overloading and default parameters may optionally be supported if the caller of the secondary API is written in a language supporting function overloading (e.g. such as C++, etc.).

Moreover, it is determined whether the secondary API invocation has completed, as shown in decision 412. For example, such determination may include determining whether the worker thread has successfully completed the invocation of the secondary API. In one embodiment, the determination may be based on whether the signal indicating that the invocation of the secondary API has completed has been received by the safe API invocation wrapper. In another embodiment, it may be determined that the secondary API invocation has completed if it is determined that the timeout has occurred.

If it is determined in decision 412 that the secondary API invocation has not completed, the API interception handler handles the failure of the invocation of the secondary API. Note operation 414. As an option, the safe API invocation wrapper may identify whether the secondary API invocation has not completed. Just by way of example, the safe API invocation wrapper may determined whether a signal indicating completion of the secondary API invocation has been received from the worker thread by the safe API invocation wrapper prior to the occurrence of the timeout.

In addition, the safe API invocation wrapper may indicate to the caller of the secondary API (e.g. the API interception handler) the failure of the invocation of the secondary API due to the timeout. For example, the failure may be returned to the caller as an error condition. In this way, the API interception handler may handle the failure of the invocation of the secondary API.

In one embodiment, the API interception handler may handle such failure by proceeding with a default action. As an example, the API interception handler may allow the thread processing the first API invocation to continue. Of course, however, the API interception handler may handle the failure in any desired manner.

Accordingly, deadlock may optionally be prevented. Additionally, performing the invocation of the secondary API from within the worker thread may also prevent other unintended side-effects of the use of the secondary API from affecting the thread associated with the first API (e.g. manipulation of thread-specific data managed internally by the secondary API, etc.).

If, however, it is determined in decision 412 that the secondary API invocation has completed, results of the secondary API invocation are made available to the API interception handler. Note operation 416. In one embodiment, the safe API invocation wrapper may retrieve the results of the secondary API invocation. The safe API invocation wrapper may further communicate such results to the API interception handler. Furthermore, the API interception handler continues processing the first API invocation, as shown in operation 418.

Figure 5:
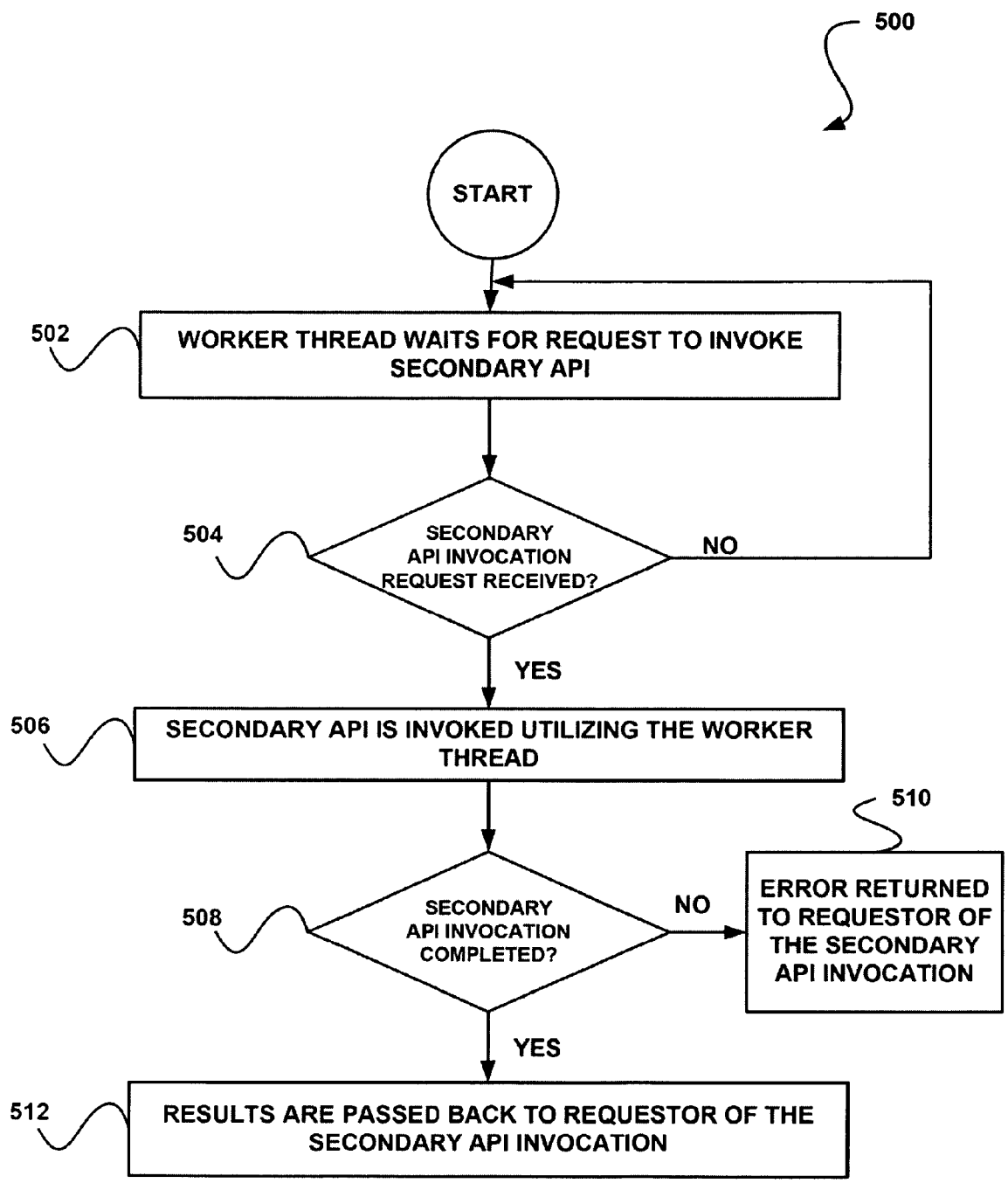
FIG. 5 shows a method for invoking a secondary API, utilizing a worker thread, in accordance with yet another embodiment.

FIG. 5 shows a method 500 for invoking a secondary API, utilizing a worker thread, in accordance with yet another embodiment. As an option, the method 500 may be carried out in the context of the architecture and environment of FIGS. 1-4. Of course, however, the method 500 may be carried out in any desired environment. It should also be noted that the aforementioned definitions may apply during the present description.

As shown in operation 502, a worker thread waits for a request to invoke a secondary API. In the context of the present embodiment, the worker thread may wait for the request to invoke the secondary API from a safe API invocation wrapper called by an API interception handler handling a first API invocation. The secondary API may be called via the first API from the API interception handler, for example.

In one embodiment, the worker thread may be included in a plurality of worker threads. Thus, the worker thread may be created prior to a determination that the secondary API is to be invoked. Of course, however, the worker thread may be created in response to the determination that the secondary API is to be invoked, in another embodiment.

Moreover, it is determined whether the secondary API invocation request has been received by the worker thread, as shown in decision 504. For example, it may be determined whether a signal has been received from the safe API invocation wrapper requesting for the secondary API to be invoked. Such request may also include parameters to be utilized by the worker thread for invoking the secondary API.

If, in decision 504, it is determined that the secondary API invocation request has not been received by the worker thread, the worker thread continues to wait for such request. If, however, it is determined in decision 504 that the secondary API invocation request has been received by the worker thread, the secondary API is invoked utilizing the worker thread. In this way, the secondary API may be invoked utilizing a thread separate from the thread utilized to invoke the first API.

Further, it is determined whether the secondary API invocation has completed, as shown in decision 508. In one embodiment, it may be determined that the secondary API invocation has completed if the worker thread returns results of the secondary API invocation. For example, the results may be returned to the API interception handler via the safe API invocation wrapper.

In another embodiment, it may be determined that the secondary API invocation has not completed if a timeout occurs with respect to the secondary API invocation. For example, the safe API invocation wrapper may determine that the secondary API invocation has not completed within a predetermined amount of time.

If it is determined that the secondary API invocation has not completed, an error is returned to the requestor of the secondary API invocation. Note operation 510. Thus, the error may be returned to the API interception handler, for example. As an option, the error may indicate that the secondary API invocation timed out.

To this end, control may be returned to the requestor of the secondary API invocation if the secondary API invocation does not complete. In one embodiment, the worker thread may be terminated if it is determined that the secondary API invocation has not completed. In another embodiment, the worker thread may be reset if it is determined that the secondary API invocation has not completed.

If it is determined that the secondary API invocation has completed, results of the secondary API invocation are passed back to the requestor of the secondary API invocation. Note operation 512. As similarly noted above, control may be returned to the requestor of the secondary API invocation once the secondary API invocation completes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable storage medium storing instructions that when executed by a programmable processing device cause the programmable processing device to:
intercept a first application program interface invoked, utilizing a first thread, by a process executing on the programmable processing device, the first thread associated with an application program interface interception handler, the application program interception handler including a callback function, the programmable processing device secured via a security system; and
invoke a second application program interface within the interception of the first application program interface, utilizing a second thread, the second thread comprising a worker thread;
wherein invoking the second application program interface within the interception of the first application program interface includes invoking the second application program interface within a context of the application program interface interception handler.

2. The non-transitory computer readable storage medium of claim 1, wherein the instructions to cause the programmable processing device to invoke the first application program interface include instructions to cause the programmable processing device to call the first application program interface.

3. The non-transitory computer readable storage medium of claim 1, wherein the first application program interface invocation is intercepted in a user mode.

4. The non-transitory computer readable storage medium of claim 1, wherein the first application program interface invocation is intercepted in a kernel mode.

5. The non-transitory computer readable storage medium of claim 1, wherein the second application program interface includes the first application program interface.

6. The non-transitory computer readable storage medium of claim 1, wherein the second application program interface is different from the first application program interface.

7. The non-transitory computer readable storage medium of claim 1, wherein the worker thread is selected from a plurality of worker threads.

8. The non-transitory computer readable storage medium of claim 1, further comprising instructions to cause the programmable processing device to invoke a wrapper function.

9. The non-transitory computer readable storage medium of claim 8, wherein the wrapper function packages a request for the second application program interface to be invoked and transmits the packaged request to the second thread.

10. The non-transitory computer readable storage medium of claim 8, wherein the wrapper function provides a timeout condition for the second application program interface.

11. The non-transitory computer readable storage medium of claim 8, wherein the wrapper function retrieves results of the invocation of the second application program interface.

12. The non-transitory computer readable storage medium of claim 1, wherein invoking the second application program interface utilizing the second thread prevents the second application program interface from affecting the first thread.

13. A method, comprising:
intercepting a first application program interface invoked, utilizing a first thread, by a process executing on a programmable processing device, the first thread associated with an application program interface interception handler, the application program interception handler including a callback function, the programmable processing device secured via a security system; and
invoking a second application program interface within the interception of the first application program interface, utilizing a second thread, the second thread comprising a worker thread;
wherein invoking the second application program interface within the interception of the first application program interface includes invoking the second application program interface within a context of the application program interface interception handler.

14. A system, comprising:
a processor for intercepting a first application program interface invoked, utilizing a first thread, by a process executing on the processor, the processor secured via a security system and further adapted to invoke a second application program interface within the interception of the first application program interface, utilizing a second thread, the second thread comprising a worker thread;
wherein the first thread is associated with an application program interface interception handler,
wherein the application program interface interception handler includes a callback function, and
wherein invoking the second application program interface within the interception of the first application program interface includes invoking the second application program interface within a context of the application program interface interception handler.

15. The system of claim 14, wherein the processor is coupled to memory via a bus.

* * * * *

UNITED STATES PATENT AND TRADEMARK OFFICE
CERTIFICATE OF CORRECTION

| | | |
|---|---|---|
| PATENT NO. | : 8,739,189 B2 | Page 1 of 1 |
| APPLICATION NO. | : 12/019514 | |
| DATED | : May 27, 2014 | |
| INVENTOR(S) | : Gregory William Dalcher et al. | |

It is certified that error appears in the above-identified patent and that said Letters Patent is hereby corrected as shown below:

On the Title page, in Item (56), in column 2, under "Other Publications", line 1, delete "Analizing" and insert -- Analyzing --, therefor.

Signed and Sealed this
Second Day of September, 2014

Michelle K. Lee
*Deputy Director of the United States Patent and Trademark Office*